United States Patent [19]
Sakuma

[11] Patent Number: 5,945,761
[45] Date of Patent: Aug. 31, 1999

[54] SWITCHED RELUCTANCE MOTOR

[75] Inventor: Masafumi Sakuma, Chiryu, Japan

[73] Assignee: Aisin Seiki Kabushiki Kaisha, Aichi-Pref, Japan

[21] Appl. No.: 08/941,276

[22] Filed: Sep. 30, 1997

[30] Foreign Application Priority Data

Sep. 30, 1996 [JP] Japan ................................ 8-258020

[51] Int. Cl.⁶ .................................................. H02P 6/02
[52] U.S. Cl. ........................... 310/168; 310/51; 310/261; 310/254
[58] Field of Search ................................ 310/209, 216, 310/51, 261, 264, 254, 162, 166, 168, 269; 318/701

[56] References Cited

U.S. PATENT DOCUMENTS

| | | | |
|---|---|---|---|
| 3,842,300 | 10/1974 | Daykin et al. | 310/216 |
| 3,984,715 | 10/1976 | Kullmann et al. | 310/219 |
| 5,233,254 | 8/1993 | Fisher et al. | 310/261 |

FOREIGN PATENT DOCUMENTS 373098  2/1961  Switzerland .
9712263 12/1997 United Kingdom .

OTHER PUBLICATIONS

Yelne, A. and Heitner, K., "Switched Reluctance Drives for Electric and Hybrid Vehicles," *Soc. Automot. Eng.*, pp. 91–102 (1996).

*Primary Examiner*—Nestor Ramirez
*Assistant Examiner*—Burton S. Mullins
*Attorney, Agent, or Firm*—Hazel & Thomas, P.C.

[57] ABSTRACT

The clearance between the stator pole portions and the rotor pole portions at the axial central portion is larger than the clearance therebetween at the axial end portions. According to these characteristics, the magnetic attracting force causing objectionable acoustic noise is increased at the axial end portions of the housing and the stator in which stiffness against the magnetic attracting force is high and decreased at the axial central portion in which their stiffness against the magnetic attracting force is low. Thereby, the objectionable acoustic noise is reduced without changing the motoring torque and increasing the weight of the switched reluctance motor.

6 Claims, 6 Drawing Sheets

SWITCHED RELUCTANCE MOTOR

BACKGROUND OF THE INVENTION

1. Field of the Invention

The present invention relates to a switched reluctance motor.

2. Description of the Prior Art

Figure 7:
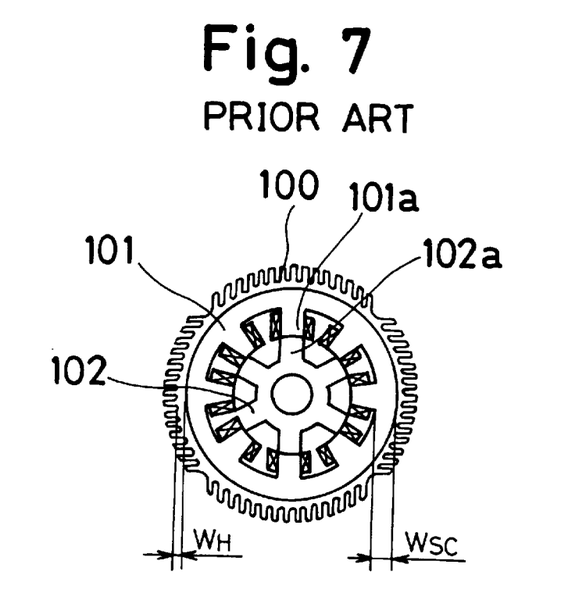
FIG. 7 is a cross-sectional view of the prior switched reluctance motor.
Figure 8:
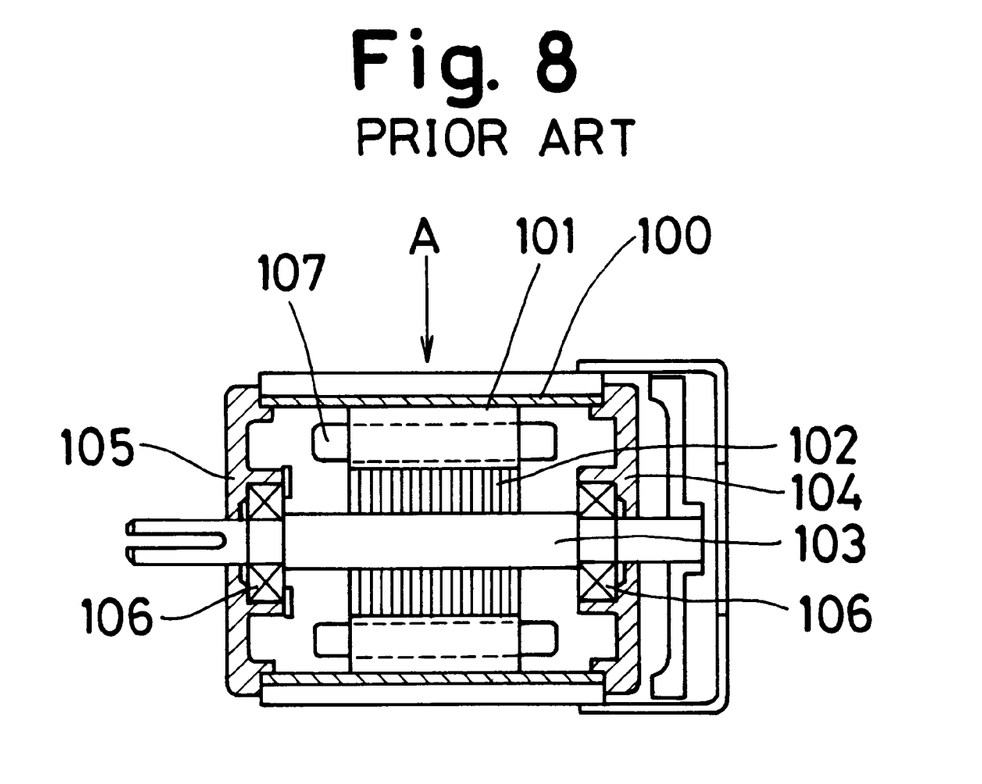
FIG. 8 is a longitudinal sectional view of the prior switched reluctance motor.

A conventional switched reluctance motor is disclosed in, for example, Switched Reluctance Drive for Electric and Hybrid Vehicles (1996 Society of Automotive Engineers, Inc.). As shown in FIGS. 7 and 8, this switched reluctance motor includes a housing 100, a stator 101 fixed in an inner bore of the housing 100 and formed by laminating electromagnetic steel plates and a rotor 102 disposed in the stator 101 and formed by laminating electromagnetic steel plates. The rotor 102 is fixed to an output shaft 103 which is rotatably supported on brackets 104 and 105 that are fixed to the housing 100 and is thereby rotatably disposed in the stator 101. The rotor 102 has three pairs of rotor pole portions 102a which project outward in the diametrical direction and which extend in the axial direction. The stator 101 has four pairs of opposing stator pole portions 101a which project inward in the diametrical direction and which extend in the axial direction. Each of the stator pole portions 101a is opposed to each of the rotor pole portions 102a in response to the rotation of the rotor 102 and a certain clearance is maintained between the stator pole portions 101a and the rotor pole portions 102a which are opposed to each other. On each of the stator pole portions 101a, a coil 107 is wound thereon. The coils 107 which are wound on each of the pairs of opposing stator pole portions 101a are connected in series with each other and thereby a magnetic flux is generated between each pairs of stator pole portions 101a when current is supplied to the coil 107. A magnetic attracting force results between the rotor pole portions 102a and the stator pole portions 101a which are approaching each other. This magnetic attracting force is changed by controlling the supply current by means of switching elements in response to the rotational position of the rotor 102, whereby motoring torque is produced.

The current supplied to the coil, when the two pairs of stator pole portions 101a are approached by two pairs of rotor pole portions 102a, is switched on and off in such a manner as to generate a pulse. In general, the current is switched on when a pair of rotor pole portions begins to be aligned with a pair of stator pole portions, and the current is switched off before a pair of rotor pole portions is aligned with a pair of stator pole portions. As a result, the magnetic attracting force increases proportionally while the current is supplied, and disappears in a moment when the current is switched off. On one hand, motoring torque is obtained by this magnetic attracting force. On the other hand, the stator pole portions are attracted radially to the rotor pole portions by this magnetic attracting force, respectively, whereby the stator and the housing are strained. When the magnetic attracting force disappears, the strain of the stator returns suddenly and simultaneously the housing is suddenly pressed outward in the diametrical direction by the stator. This impulsive variation of the housing generates periodically in response to the rotation of the rotor, whereby vibration of the housing causes objectionable acoustic noise.

In the above prior switched reluctance motor, this noise increases most at the portion A in FIG. 8. The reason for that is the stiffness against the above magnetic attracting force is high at both ends of the housing which is fixed to the brackets and is low at the central portion of the housing in the axial direction. Therefore, the amplitude of the vibration increases at the central portion of the housing in the axial direction. Accordingly, if the stiffness of the portion of the housing in which the amplitude of the vibration is large is increased, it is possible to reduce the noise. In the above prior switched reluctance motor, in order to take this measure, it is necessary to increase the back-yoke thickness $W_{SC}$ of the stator and the housing thickness $W_H$ at the A portion in FIG. 8. However, since the housing is normally made of aluminum, even if the housing thickness $W_H$ is increased a little, it is impossible to expect the increase of the stiffness of the housing. Further, when the back-yoke thickness $W_{SC}$ of the stator is increased, it is not easy to increase the back-yoke thickness $W_{SC}$ of only the central portion from the point of view of manufacturing. Accordingly, an increase in the weight of the motor is unavoidable.

SUMMARY OF THE INVENTION

It is, therefore, an object of the present invention to provide an improved switched reluctance motor which overcomes the above drawbacks.

It is another object of the present invention to provide an improved switched reluctance motor which can reduce the objectionable acoustic noise without increasing the weight of the motor.

In order to achieve these objectives, there is provided a switched reluctance motor which includes a housing, a stator held on the housing and having a plurality of pairs of opposing stator pole portions which project inward in the diametrical direction and which extend in the axial direction, a rotor rotatably disposed in the stator and having a plurality of rotor pole portions which project outward in the diametrical direction and which extend in the axial direction so as to be able to oppose the stator pole portions while maintaining a clearance therebetween, and a plurality of coils wound on each of the pairs of the stator pole portions, wherein the clearance between the stator pole portions and the rotor pole portions at the axial central portion is larger than the clearance therebetween at both axial end portions.

BRIEF DESCRIPTION OF THE DRAWINGS

Additional objects and advantages of the present invention will become more apparent from the following detailed description of preferred embodiments thereof when considered with reference to the attached drawings, in which.

DESCRIPTION OF THE PREFERRED EMBODIMENTS

A switched reluctance motor constituted in accordance with preferred embodiments of the present invention will be described with reference to attached drawings.

Figure 1:
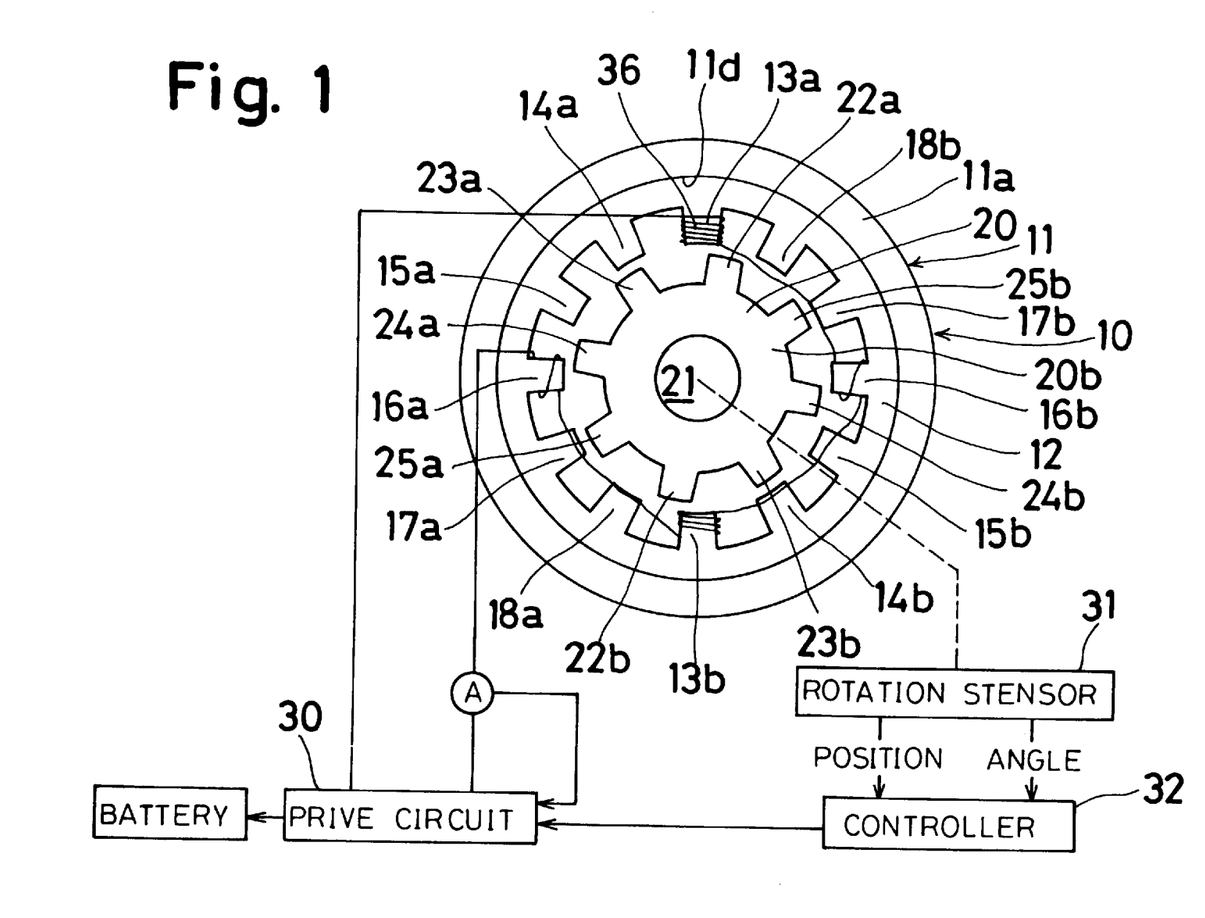
FIG. 1 is a schematic view of a first embodiment of a switched reluctance motor in accordance with the present invention.
Figure 2:
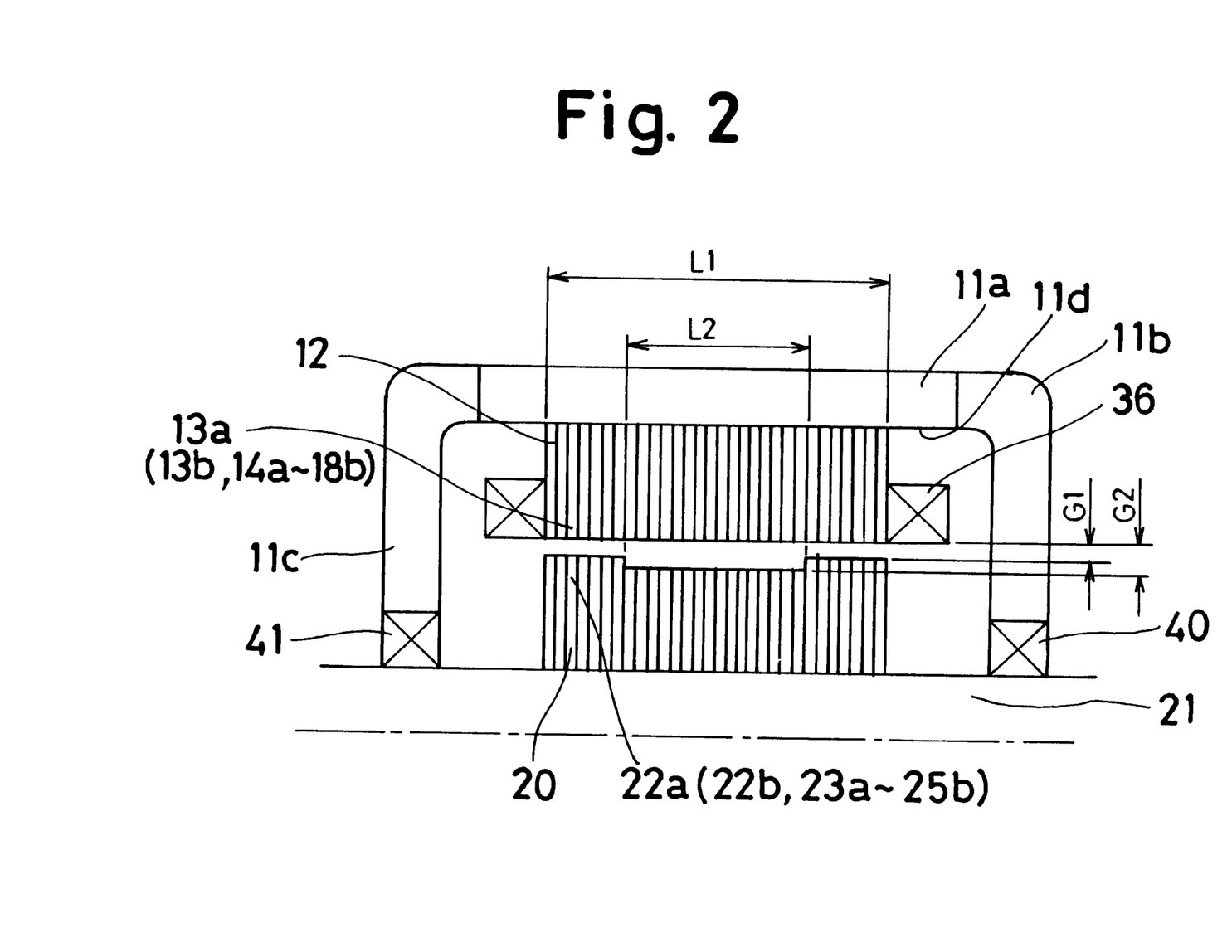
FIG. 2 is a longitudinal sectional view of a first embodiment of a switched reluctance motor in accordance with the present invention.

Referring to FIGS. 1 and 2, a switched reluctance motor 10 is provided with a cylindrical housing 11 which is made of aluminum. The housing 11 is composed of a cylindrical portion 11a and brackets 11b, 11c which are fixed to ends of the cylindrical portion 11a. In an inner bore 11d of the cylindrical portion 11a, a cylindrical stator 12 is disposed therein. The stator 12 is formed by laminating electromagnetic steel plates and is fixed to the inner bore lid of the housing 11 at its outer circumferential portion by heat shrinking. The stator 12 may be fixed to the inner bore 11d by press fitting or the use of adhesives and so on.

The stator 12 is provided with six pairs of opposing stator pole portion 13a, 13b; 14a, 14b; 15a, 15b; 16a, 16b; 17a, 17b; 18a, 18b which project inward in the diametrical direction at regular intervals and which extend in the axial direction, respectively.

With each pair of stator pole portions, for example, on two pairs of stator pole portions 13a, 13b and 16a, 16b, coils 36 are wound thereon, respectively and are connected in series with each other. Coils (not shown) are wound on each of two pairs of stator pole portions 14a, 14b with 17a, 17b and 15a, 15b with 18a, 18b and are connected in pairs in series. These coils are connected with a drive circuit 30.

A rotor 20 which is formed by laminating electromagnetic steel plates is provided with a central hole at its axial center. An output shaft 21 which is rotatably supported on the brackets 11b, 11c at both ends through bearings 40, 41 is fixedly fitted into the central hole of the rotor 20. Thereby, the rotor 20 is able to rotate with the output shaft 21 in a body in the stator 12. Furthermore, the rotor 20 is provided with four pairs of opposing rotor pole portion 22a, 22b; 23a, 23b; 24a, 24b; 25a, 25b which project outward in the diametrical direction at regular intervals and which extend in the axial direction, respectively. As shown in FIG. 1, each of these rotor pole portions 22a, 22b; 23a, 23b; 24a, 24b; 25a, 25b is able to be opposed to each of the stator pole portions 13a, 13b; 14a, 14b; 15a, 15b; 16a, 16b; 17a, 17b; 18a, 18b while maintaining a certain clearance therebetween in response to the rotation of the rotor 20.

In this first embodiment, as shown in FIG. 2, this clearance is not uniform in the axial direction. In FIG. 2, L1 is an axial length (the laminating thickness) of the stator 12 and the rotor 20. The outer diameter of the electromagnetic steel plates which constitutes the rotor 20 and which is located at the axial central portion having an axial length L2 is smaller than the outer diameter of the electromagnetic steel plates which constitute the rotor 20 and which are located at both axial end portions. The inner diameter of each of the electromagnetic steel plates which constitutes the stator 12 is formed uniformly. As a result, the clearance G2 between each of the stator pole portions 13a, 13b; 14a, 14b; 15a, 15b; 16a, 16b; 17a, 17b; 18a, 18b and each of the rotor pole portions 22a, 22b; 23a, 23b; 24a, 24b; 25a, 25b located at the axial central portion is larger than the clearance G1 between each of the stator pole portions and each of the rotor pole portions which is located at both axial end portions. The stiffness of the cylindrical portion 11a located at the axial central portion (L2) is lower than that of both axial end portions of the cylindrical portion 11a which is fixed to the brackets 11b, 11c.

A well known rotation sensor 31, e.g., such as an encoder or a resolver and so on, is disposed on the end of the output shaft 21 in order to detect the rotation position of the rotor 20. The rotation sensor 31 is electrically connected to a controller 32 and therefore a position signal and an angle signal detected by the rotation sensor 31 is transmitted to the controller 32.

The controller 32 is electrically connected to the drive circuit 30 to which the coils wound on each of the stator pole portions 13a, 13b; 14a, 14b; 15a, 15b; 16a, 16b; 17a, 17b; 18a, 18b are connected thereto, and transmits an output signal to the drive circuit 30 in response to a position signal and an angle signal of the rotation sensor 31. The drive circuit 30 is composed of an inverter using switching elements, such as transistors or thyristors and supplies current such as a pulse to each of the coils in response to the output signal of the controller 32.

The above-described first embodiment of the switched reluctance motor 10 operates as follows:

When it is detected by the rotation sensor 31 that the rotor 20 is in a predetermined position in which two of four pairs of rotor pole portion 22a, 22b; 23a, 23b; 24a, 24b; 25a, 25b begin to be opposed to two of six pairs of stator pole portion 13a, 13b; 14a, 14b; 15a, 15b; 16a, 16b; 17a, 17b; 18a, 18b, respectively, the controller 32 transmits an output signal responding to the detected signal of the rotation sensor 31 to the drive circuit 30. The drive circuit 30 supplies current to the coils which are wound on two pairs of stator pole portions opposite to two pairs of rotor pole portions in response to the output signal of the controller 32. Thereby, the stator pole portions on which these coils are wound thereon are magnetized and a magnetic flux is generated between the magnetized stator pole portions through the rotor pole portions located between the magnetized stator pole portions. A magnetic attracting force results between the rotor pole portions and the stator pole portions which are opposing each other and a torque acts on the rotor 20 by a component force of the magnetic attracting force so as to let the rotor pole portions oppose the stator pole portions.

Figure 3:
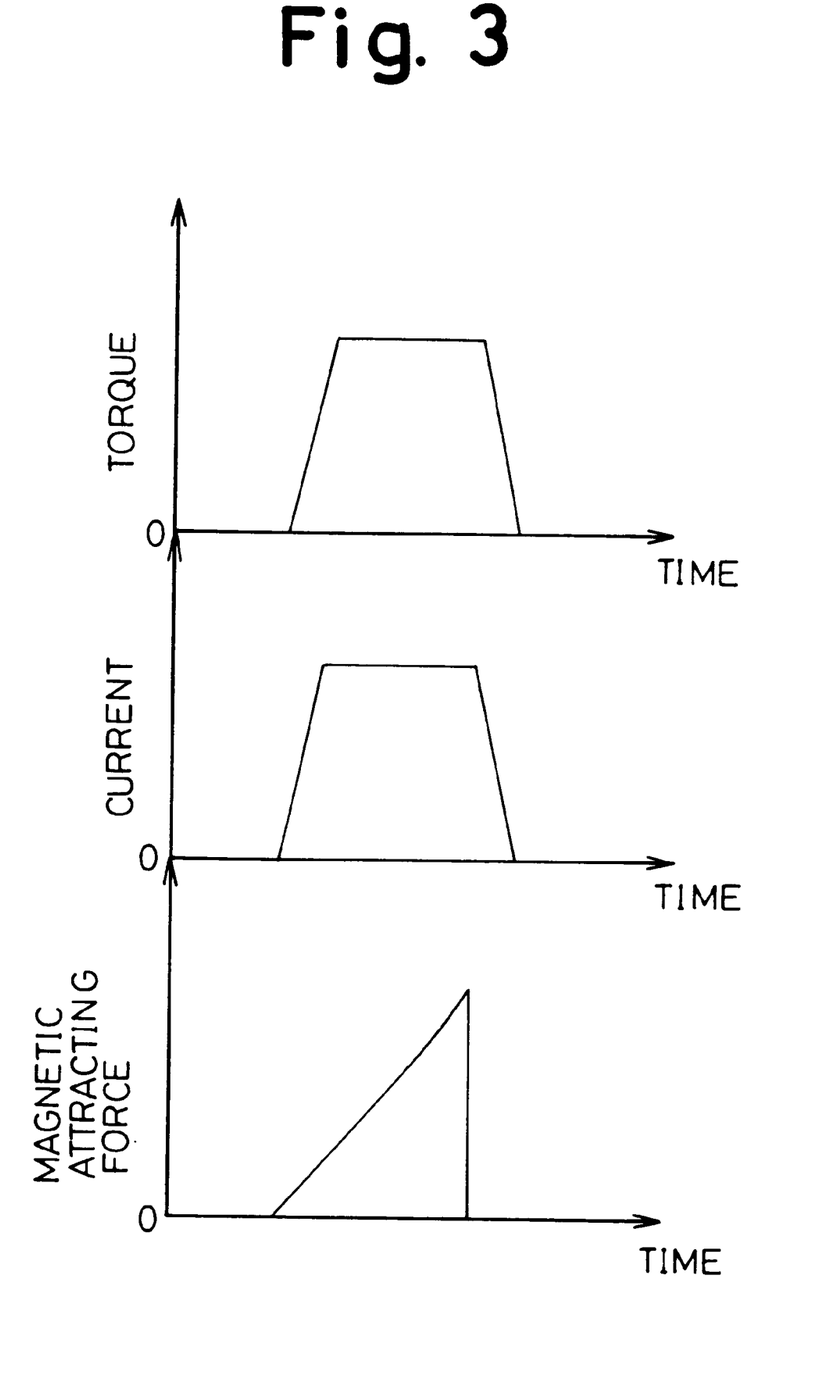
FIG. 3 is a graph which shows variations of torque, current and magnetic attracting force at the supply of current to a coil of a first embodiment of a switched reluctance motor in accordance with the present invention.

When the rotor 20 is rotated by the torque and it is detected by the rotation sensor 31 that the rotor 20 is in a predetermined position in which two pairs of rotor pole portions are just before an aligned position with regard to two pairs of magnetized stator pole portions, respectively, that is to say, it is detected by the rotation sensor 31 that the rotor 20 is in a final effective position in which the above component force acts on the rotor 20, the drive circuit 30 stops supplying the current to the coils wound on the magnetized stator pole portions in response to the output signal of the controller 32 which is made in response to this detected signal of the rotation sensor 31. As mentioned above, the current which is supplied to the coils wound on two pairs of the stator pole portions opposing two pairs of rotor pole portions is switched on and off such as a pulse and a certain motoring torque is obtained by the action of the above magnetic attracting force. FIG. 3 shows variations of the torque, the current and the magnetic attracting force at the above supplying of the current to the coils which are wound on two pairs of stator pole portions. Now, the above on-off timing of the supply of the current is determined in response to the demand of the rotational speed or the torque of the switched reluctance motor.

On the other hand, two pairs of magnetized stator pole portions which are opposed to two pairs of rotor pole portions are attracted to the opposing rotor pole portions by the above magnetic attracting force, respectively and thereby the stator 12 is strained. For example, in FIG. 1, the stator pole portions 13a, 13b; 16a, 16b opposing to the rotor pole portions 22a, 22b; 24a, 24b are magnetized by the supplying of the current to the coil 36 and are attracted to the rotor pole portions 22a, 22b; 24a, 24b, respectively. Thereby, the stator 12 is strained. When the magnetic attracting force disappears by the switching off of the current, the strain of the stator 12 returns suddenly and simultaneously the housing 11 is suddenly pressed outward in the diametrical direction by the stator 12. This impulsive variation (vibration) of the housing 11 generates periodically in response to the magnetization of each of the stator pole portions 13a, 13b; 14a, 14b; 15a, 15b; 16a, 16b; 17a, 17b; 18a, 18b. Since the stiffness of the axial central portion of the cylindrical portion 11a against the magnetic attracting force is lower than that of the axial end portions thereof, which are fixed to the brackets 11b, 11c, when the clearance between the rotor pole portions and the stator pole portions which are opposing each other and magnetic attracting force generated between the rotor pole portions and the stator pole portions which are opposing each other are uniform in the axial direction, the strain of the stator 12 increases most at the axial central portion.

In this first embodiment, the clearance G1 between each of the stator pole portions 13a, 13b; 14a, 14b; 15a, 15b; 16a, 16b; 17a, 17b; 18a, 18b and each of the rotor pole portions 22a, 22b; 23a, 23b; 24a, 24b; 25a, 25b which is located at the axial end portions having a high stiffness against the magnetic attracting force is decreased so that the magnetic attracting force and the torque are increased at the axial and portions. The clearance G2 between each of the stator pole portions 13a, 13b; 14a, 14b; 15a, 15b; 16a, 16b; 17a, 17b; 18a, 18b and each of the rotor pole portions 22a, 22b; 23a, 23b; 24a, 24b; 25a, 25b which is located at the axial central portion having a low stiffness against the magnetic attracting force is increased so that the magnetic attracting force and the torque are decreased at the axial central portion. Thereby, the maximum strain of the stator 12 and the maximum amplitude of the vibration of the housing 11 (the cylindrical portion 11a) due to the magnetic attracting force is decreased without changing the motoring torque. As a result, it is possible to reduce the objectionable acoustic noise without increasing the weight of the motor.

Figure 4:
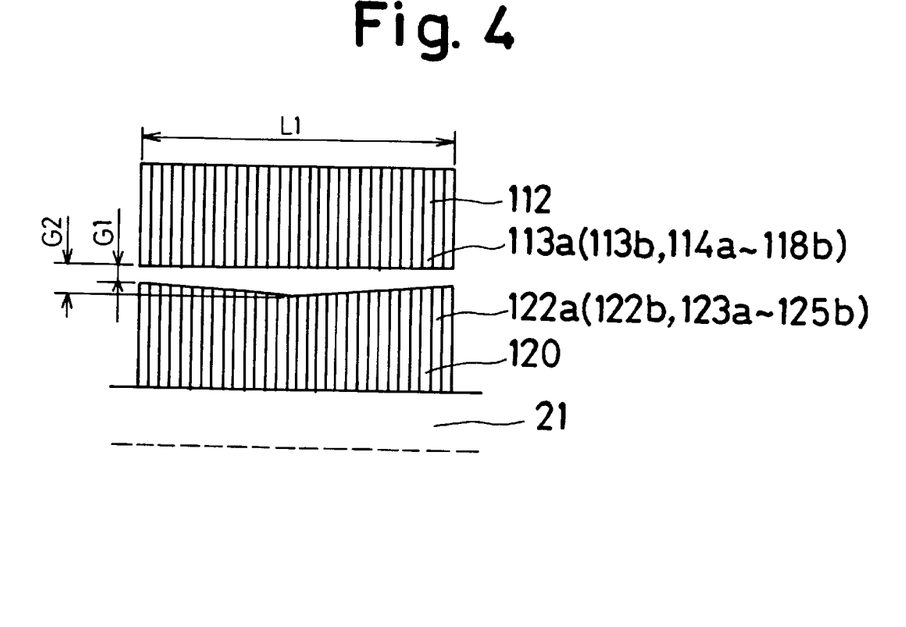
FIG. 4 is a longitudinal sectional view of a second embodiment of a stator and a rotor of a switched reluctance motor in accordance with the present invention.

FIG. 4 shows a stator 112 and a rotor 120 of a second embodiment in accordance with the present invention. In this second embodiment, the inner diameter of each of the electromagnetic steel plates which constitutes the stator 112 is formed uniformly and the outer diameter of the electromagnetic steel plates which constitute the rotor 120 is gradually decreased from both axial ends tb the central portion. Thereby, the clearance G2 between each of the stator pole portions 113a, 113b; 114a, 114b; 115a, 115b; 116a, 116b; 117a, 117b; 118a, 118b and each of the rotor pole portions 122a, 122b; 123a, 123b; 124a, 124b; 125a, 125b which is located at the axial central portion is larger than the clearance G1 between each of the stator pole portions and each of the rotor pole portions which is located at both axial end portions.

Figure 5:
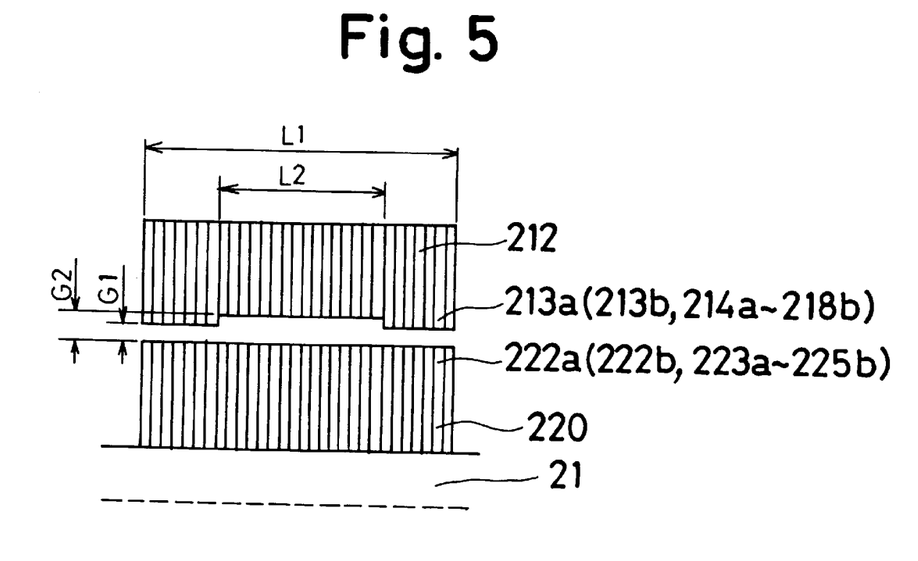
FIG. 5 is a longitudinal sectional view of a third embodiment of a stator and a rotor of a switched reluctance motor in accordance with the present invention.

FIG. 5 shows a stator 212 and a rotor 220 of a third embodiment in accordance with the present invention. In this third embodiment, the inner diameter of the electromagnetic steel plates which constitutes the stator 212 and which is located at the axial central portion having an axial length L2 is smaller than the inner diameter of the electromagnetic steel plates which constitutes the stator 212 and which is located at the axial both end portions. The outer diameter of each of the electromagnetic steel plates which constitute the rotor 220 is formed uniformly. Thereby, the clearance G2 between each of the stator pole portions 213a, 213b; 214a, 214b; 215a, 215b; 216a, 216b; 217a, 217b; 218a, 218b and each of the rotor pole portions 222a, 222b; 223a, 223b; 224a, 224b; 225a, 225b which is located at the axial central portion is larger than the clearance G1 between each of the stator pole portions and each of the rotor pole portions which is located at both axial end portions.

FIG. 4 shows a stator 312 and a rotor 320 of a fourth embodiment in accordance with the present invention. In this fourth embodiment, the outer diameter of each of the electromagnetic steel plates which constitute the rotor 320 is formed uniformly and the inner diameter of the electromagnetic steel plates which constitutes the stator 320 is gradually decreased from the axial both ends to the central portion. Thereby, the clearance G2 between each of the stator pole portions 313a, 313b; 314a, 314b; 315a, 315b; 316a, 316b; 317a, 317b; 318a, 318b and each of the rotor pole portions 322a, 322b; 323a, 323b; 324a, 324b; 325a, 325b which is located at the axial central portion is larger than the clearance G1 between each of the stator pole portions and each of the rotor pole portions which is located at both axial end portions.

Figure 6:
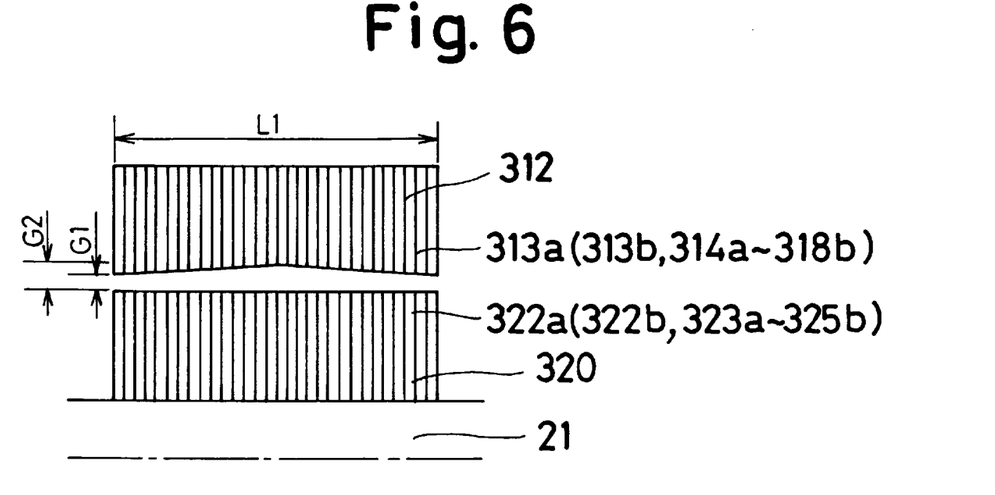
FIG. 6 is a longitudinal sectional view of a fourth embodiment of a stator and a rotor of a switched reluctance motor in accordance with the present invention.

According to these second, third and fourth embodiments, as the above mentioned first embodiment, it is possible to decrease the maximum strain of the stator and the maximum amplitude of the vibration of the housing (the cylindrical portion) due to the magnetic attracting force without changing the motoring torque. As a result, it is possible to reduce the objectionable acoustic noise without increasing the weight of the motor.

In the above mentioned four embodiments, the length L1, the length L2, the ratio of L1 to L2, the clearance G1 and the clearance G2 are determined in response to the specification of the switched reluctance motor and the required noise level. Therefore, the outer diameter of each of the rotor pole portions which is located at the axial central portion may be smaller than the outer diameter of each of the rotor pole portions which is located at the axial both end portions and the inner diameter of each of the stator pole portions which is located at the axial central portion may be smaller than the inner diameter of each of the stator pole portions which is located at both axial end portions in response to these demands.

Furthermore, in the above mentioned four embodiments, the present invention is applied to a switched reluctance motor which includes a stator having six pairs of stator pole portions and a rotor having four rotor pole portions. However, it is possible to apply the present invention to other type of switched reluctance motors, for example a switched reluctance motor which includes a stator having three pairs of stator pole portions and a rotor having two pairs of rotor pole portions. The above on-off timing of the supply of the current is determined in response to the demand of the rotational speed or the torque of the switched reluctance motor.

As mentioned above, according to the present invention, the magnetic attracting force causing the objectionable acoustic noise is increased at both axial end portions of the housing and the stator in which their stiffness against the magnetic attracting force is high and decreased at the axial central portion in which the stiffness against the magnetic attracting force is low. Accordingly, it is possible to reduce the objectionable acoustic noise without changing the motoring torque or increasing the weight of the switched reluctance motor.

The principles, preferred embodiments and modes of operation of the present invention have been described in the foregoing description. The invention which is intended to be protected herein should not, however, be construed as limited to the particular forms disclosed, as these are to be regarded as illustrative rather than restrictive. Variations and changes may be made by those skilled in the art without departing from the spirit of the present invention. Accordingly, the foregoing detailed description should be considered exemplary in nature and not limited to the scope and spirit of the invention as set forth in the appended claims.

What is claimed is:

1. A switched reluctance motor comprising:

a housing, a shaft rotatable supported by the housing, a stator held on the housing and having a plurality of pairs of opposing stator pole portions which project inward in a diametrical direction and which extend in an axial direction of the shaft, a rotor penetrated by the shaft and disposed in the stator, the rotor having a plurality of rotor pole portions which project outward in the diametrical direction and which extend in the axial direction of the shaft, a length of the rotor in an axial direction thereof being the same as that of the stator, so as to be able to opposingly position the rotor pole portions with the stator pole portions while maintaining a clearance therebetween, and a plurality of coils wound on each of the pairs of stator pole portions, wherein a clearance between the stator pole portions and the rotor pole portions at an axial central portion of the rotor is larger than a clearance therebetween at axial end portions of the rotor.

2. A switched reluctance motor as recited in claim 1, wherein the inner diameter of each of the stator pole portions is formed uniformly in the axial direction and the outer diameter of each of the rotor pole portions which is located at the axial central portion is smaller than the outer diameter of each of the rotor pole portions which is located at the axial end portions.

3. A switched reluctance motor as recited in claim 1, wherein the outer diameter of each of the rotor pole portions is formed uniformly in the axial direction and the inner diameter of each of the stator pole portions which is located at the axial central portion is smaller than the inner diameter of each of the stator pole portions which is located at the axial end portions.

4. A switched reluctance motor as recited in claim 1, wherein an outer diameter of each of the rotor pole portions located at the axial central portion is smaller than an outer diameter of each of the rotor pole portions located at the axial end portions.

5. A switched reluctance motor as recited in claim 1, wherein an inner diameter of each of the stator pole portions located at the axial central portion is smaller than an inner diameter of each of the stator pole portions located at the axial end portions.

6. A switched reluctance motor comprising:

a housing, a shaft, bearings for supporting both ends of the shaft, a stator held on the housing and having a plurality of pairs of opposing stator pole portions which project inward in the diametrical direction and which extend in the axial direction of the shaft, a rotor fixed to the shaft and disposed in the stator with a clearance therebetween, the rotor having a plurality of rotor pole portions which project outward in the diametrical direction and which extend along an axial direction of the shaft, a length of the rotor along an axial direction thereof being the same as that of the stator, so as to opposingly position the rotor pole portions with the stator pole portions while maintaining the clearance therebetween, and a plurality of coils wound on each of the pairs of stator pole portions, wherein the clearance between the stator pole portions and the rotor pole portions is smaller nearer the bearings than the clearance farther from the bearings along the axial direction of the rotor and the stator.

* * * * *